United States Patent
Quigley, III

(10) Patent No.: US 7,704,034 B1
(45) Date of Patent: Apr. 27, 2010

(54) MOTORCYCLE TOWING DEVICE AND METHOD

(76) Inventor: Richard I. Quigley, III, 215 Barney Rd., High Point, NC (US) 27265

( * ) Notice: Subject to any disclaimer, the term of this patent is extended or adjusted under 35 U.S.C. 154(b) by 238 days.

(21) Appl. No.: 11/888,261

(22) Filed: Jul. 31, 2007

(51) Int. Cl.
  *B60P 3/07* (2006.01)
(52) U.S. Cl. .................. 414/462; 414/427; 280/402
(58) Field of Classification Search ......... 414/463–466, 414/427, 462; 280/402
See application file for complete search history.

(56) References Cited

U.S. PATENT DOCUMENTS

| | | | | |
|---|---|---|---|---|
| 3,428,332 A | * | 2/1969 | McCance | 280/402 |
| 3,430,983 A | * | 3/1969 | Jones | 280/402 |
| 3,822,898 A | * | 7/1974 | Brownlie | 280/402 |
| 4,738,581 A | * | 4/1988 | Kuhlman | 414/462 |
| 5,211,526 A | * | 5/1993 | Robinette | 414/550 |
| 5,366,338 A | * | 11/1994 | Mortensen | 414/563 |
| 5,620,197 A | * | 4/1997 | Howes | 280/402 |
| 5,906,386 A | * | 5/1999 | Baker et al. | 280/404 |
| 6,352,401 B1 | * | 3/2002 | LeMay | 414/463 |
| 6,651,996 B1 | * | 11/2003 | Allemang | 280/402 |
| 6,682,292 B2 | * | 1/2004 | Estes | 414/462 |
| 7,188,856 B2 | * | 3/2007 | Maynard | 280/402 |
| 2008/0143077 A1 | * | 6/2008 | McClellan | 280/402 |

* cited by examiner

*Primary Examiner*—James Keenan

(57) ABSTRACT

An apparatus for towing a bike, tricycle or the like having front and rear wheels including a pivoting tongue, a base and an extensible support member for receiving a front of the bike yet permitting one or more rear wheels to remain in contact with the ground. An opposing pair of arms are each carried by a pair of support arms for connection to the base of the apparatus. The support arms are pivotably connected to the base to rotate toward the support member for storing the apparatus and from the support member to secure tie arms for retaining the bike in connection with the apparatus and stabilizing the bike under tow.

9 Claims, 7 Drawing Sheets

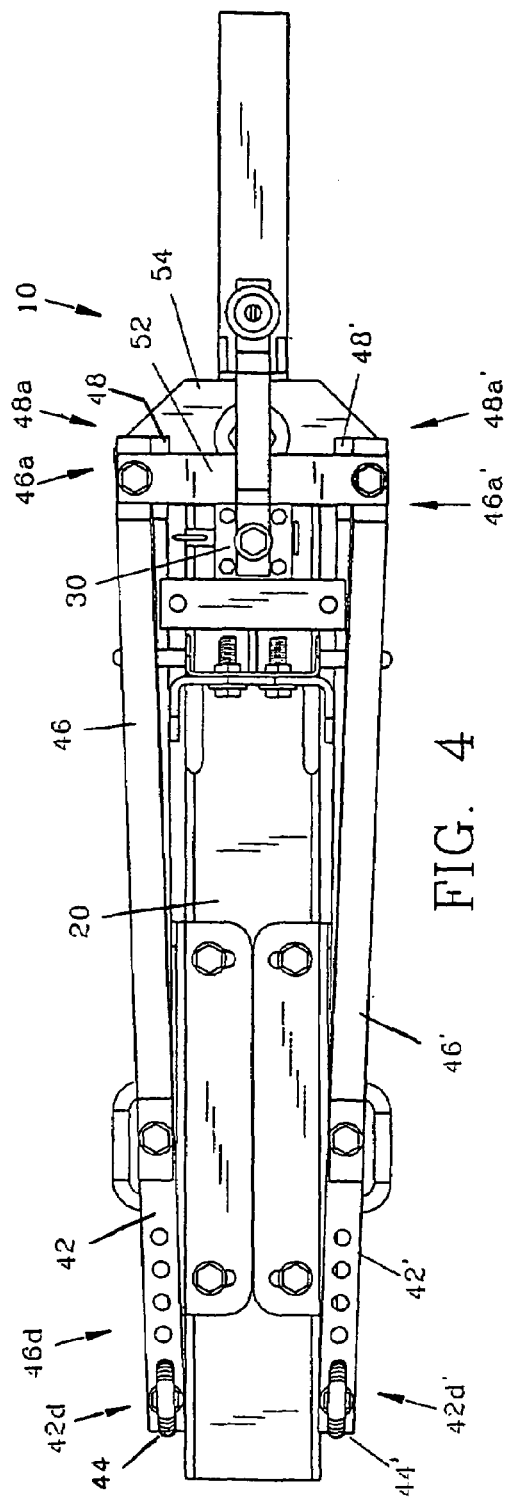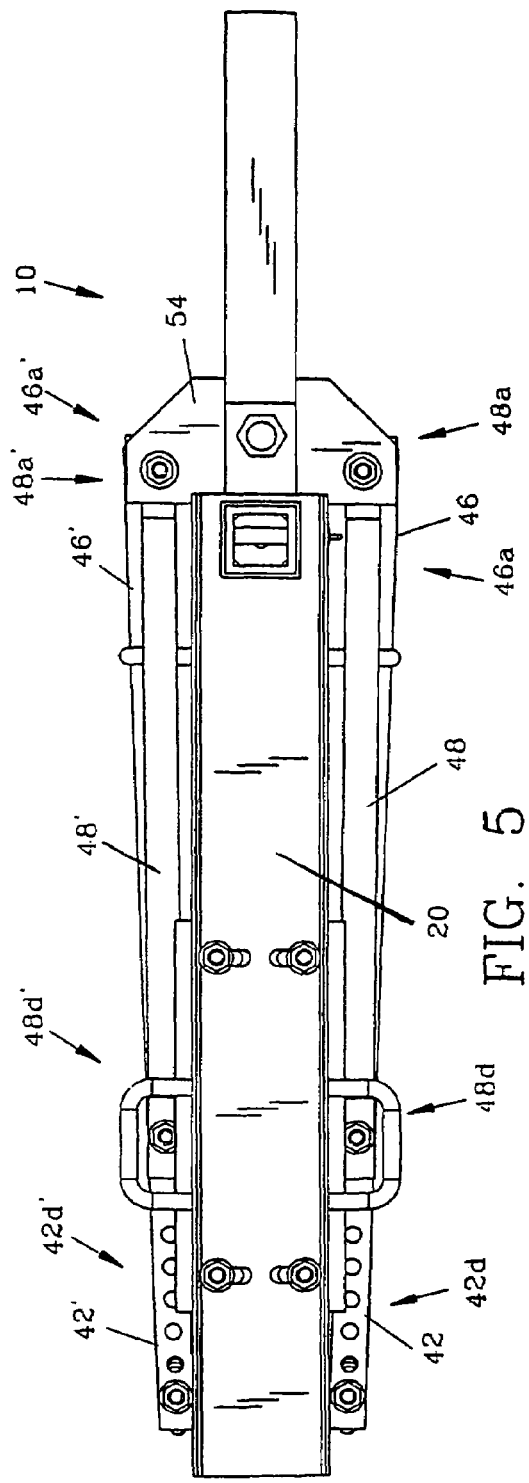

MOTORCYCLE TOWING DEVICE AND METHOD

FIELD OF THE INVENTION

The invention herein pertains to an apparatus for towing a motorcycle (bike) by lifting and securing the front of the bike behind a tow vehicle.

DESCRIPTION OF THE PRIOR ART AND OBJECTIVES OF THE INVENTION

U.S. Pat. No. 6,352,401 to LeMay discloses a carrier apparatus for attachment to the rear of a tow vehicle. The LeMay apparatus includes a member extensible for receiving the front wheel of a bike and retractable to lift the front wheel for towing. The extensible member includes opposing arms adapted to receive straps securing the front wheel to the apparatus.

The LeMay carrier, however, does not pivot when the tow vehicle changes directions. Rather, the rear of the bike pivots in relation to the front. With this system, often, the rear of the bike swings away from a turning direction of the tow vehicle under tow, which is undesirable.

Therefore, an objective of the present invention is to provide an apparatus for towing a bike behind a tow vehicle that pivots to turn the bike when the tow vehicle changes its direction.

Another objective of the present invention is to provide an apparatus for towing a bike behind a tow vehicle that maintains control of the bike.

Another objective of the present invention is to provide an apparatus for towing a bike behind a tow vehicle that has a selectively variable width.

Yet another objective of the present invention is to provide an apparatus for towing a bike behind a vehicle that is capable of use with a variety of motorcycle types.

Various other objectives and advantages of the present invention will become apparent to those skilled in the art as a more detailed description is set forth below.

SUMMARY OF THE INVENTION

The aforesaid and other objectives are realized by providing embodiments of an apparatus for towing a bike, tricycle or the like having front and rear wheels. In the preferred embodiment, the apparatus includes a pivoting tongue, a base and an extensible support member for receiving a front wheel, or at least a front end portion, of the bike while permitting one or more rear wheels to remain in contact with the ground. An opposing pair of tie arms for connection to the base of the apparatus are each carried by a pair of support arms, which are pivotably connected to the base to rotate toward the support member for storing the apparatus and away from the support member to secure the tie arms to the base. The tie arms include strap receiving brackets for fastening the bike to the apparatus and stabilizing the bike under tow.

BRIEF DESCRIPTION OF THE DRAWINGS

FIG. 4 is a top plan view of an apparatus for towing a bike as seen in FIG. 2;

FIG. 5 is a bottom plan view of an apparatus for towing a bike as seen in FIG. 2;

DETAILED DESCRIPTION OF THE PREFERRED EMBODIMENT AND OPERATION OF THE INVENTION

Figure 1:
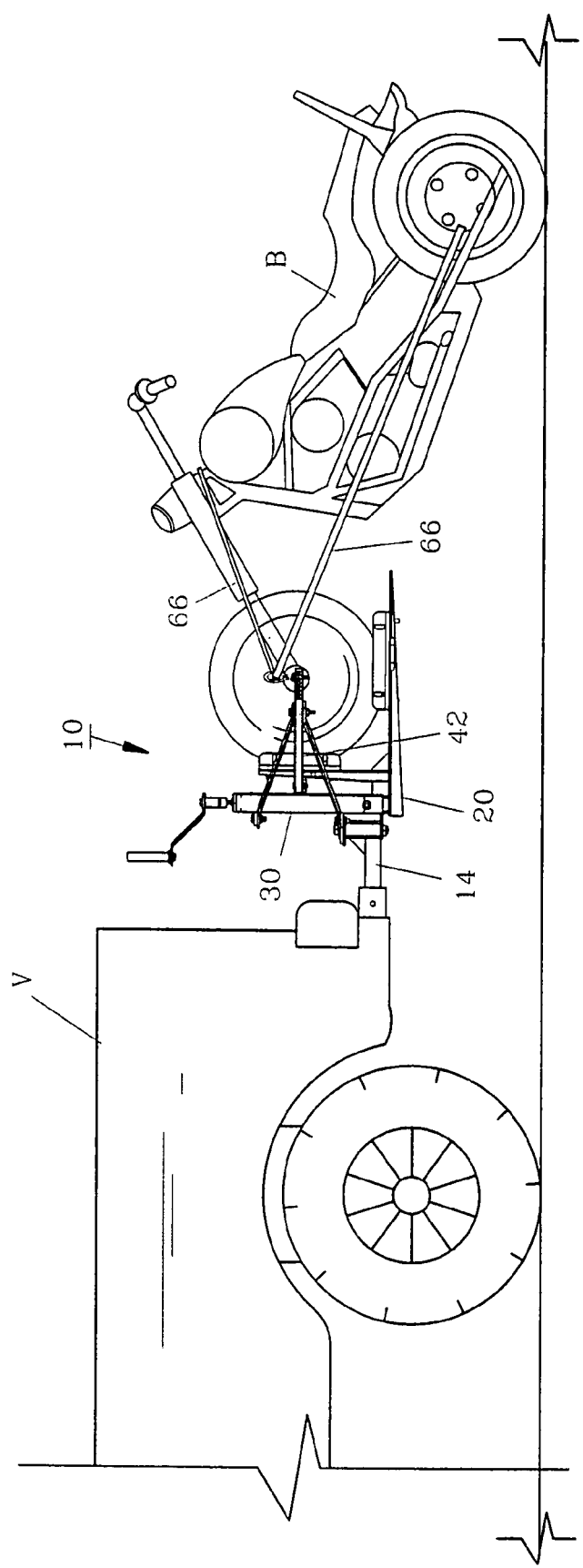
FIG. 1 is a side elevational view of an apparatus for towing a bike attached to the rear of a vehicle with a motorcycle secured to the towing device.
Figure 2:
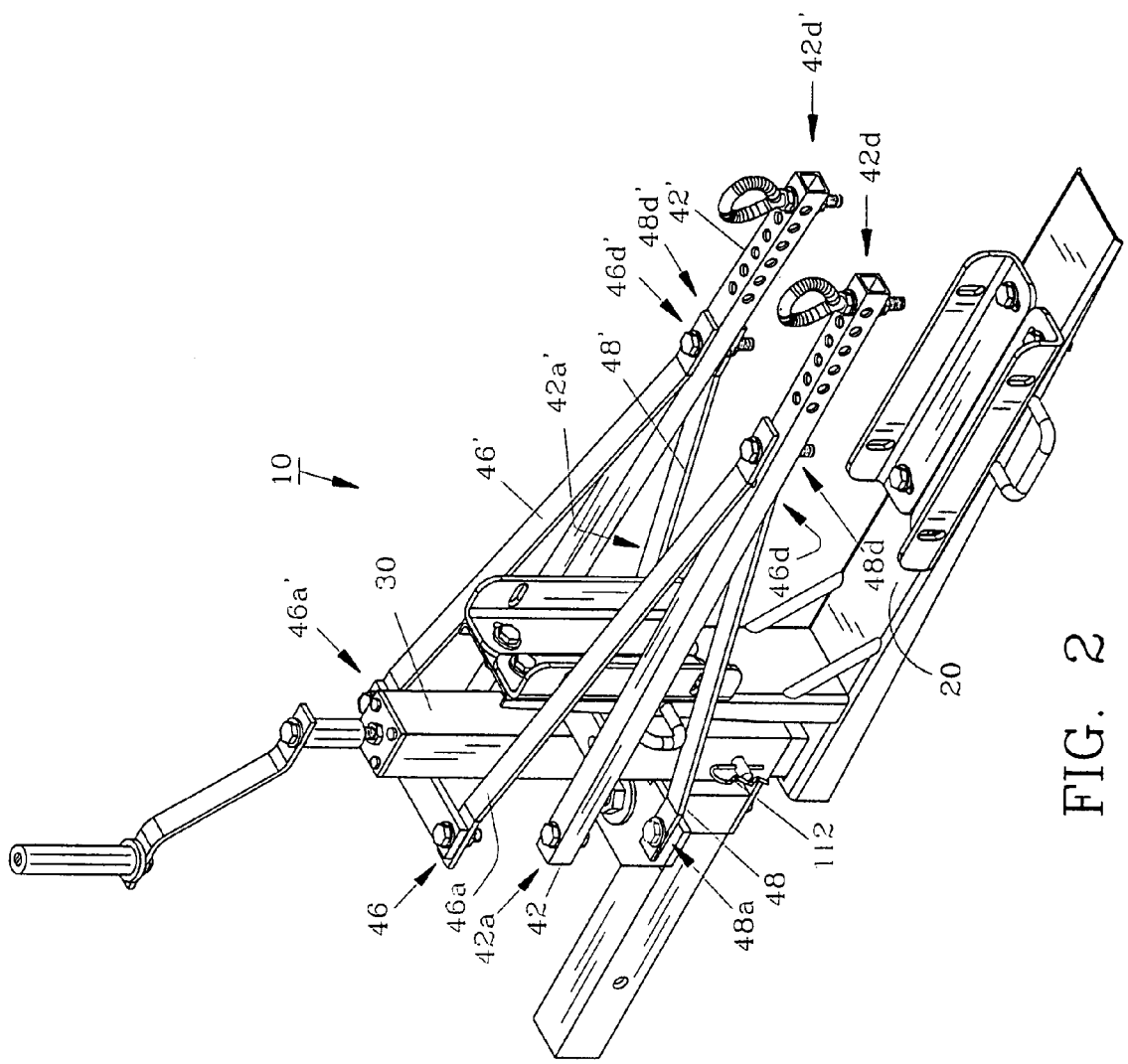
FIG. 2 is a rear perspective view of an apparatus for towing a bike in a configuration for storage.
Figure 3:
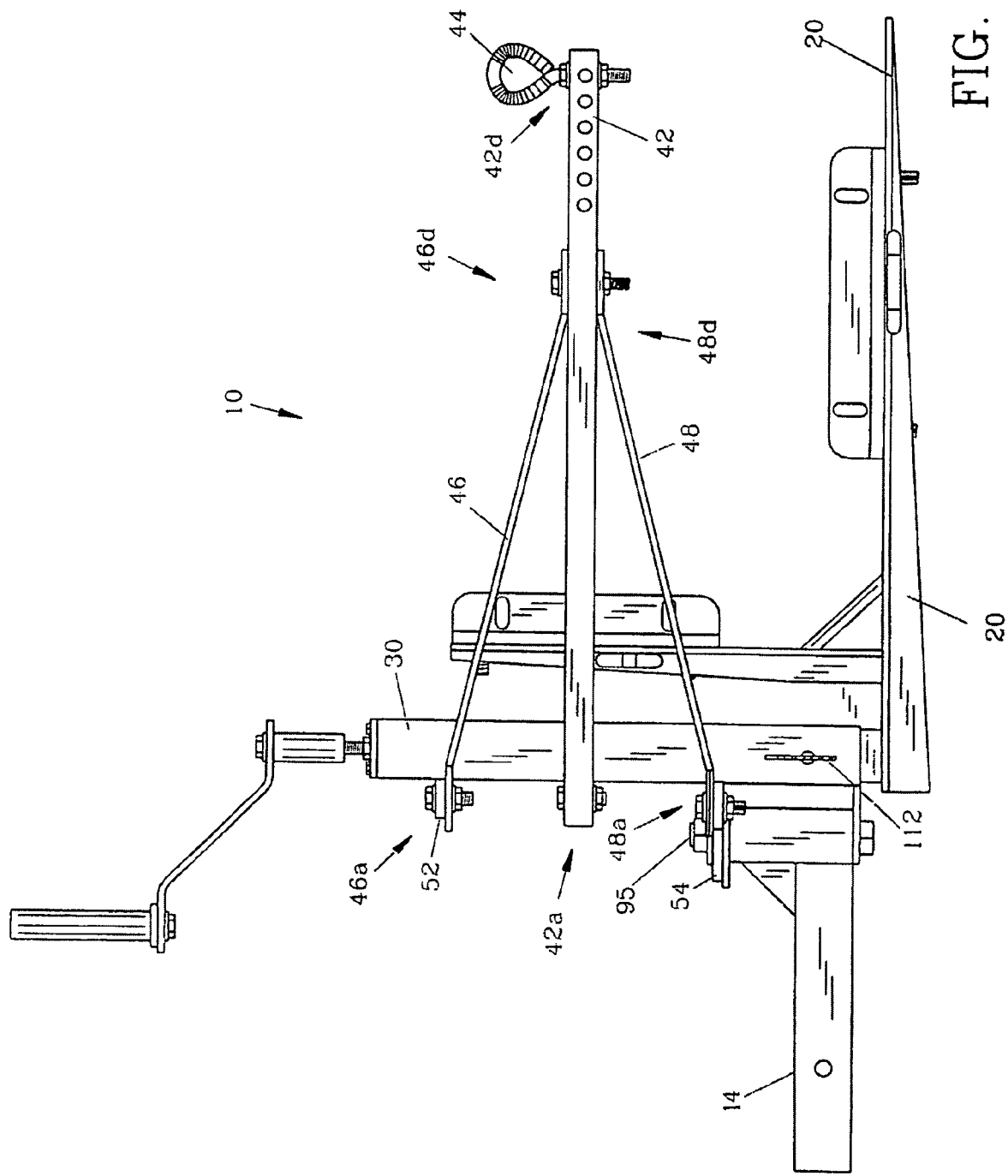
FIG. 3 is a side elevational view of an apparatus for towing a bike as seen in FIG. 2.

For a better understanding of the invention and its operation, turning now to the drawings, FIG. 1 shows the preferred embodiment of apparatus 10 for connection to the rear of vehicle V for towing bike B, although apparatus 10 can also be employed to tow a tricycle or the like behind vehicle V. FIG. 1 shows apparatus 10 including support member 20 for receiving the front of bike B, pivoting tongue 14, base 30, and tie arm 42. Retaining straps 66, preferably in the form of nylon ratchet straps, are used to secure bike B to apparatus 10.

FIGS. 2-5 show apparatus 10 in a preferred storage configuration. Upper 46 and lower 48 support arms are connected to one side of base 30 at ends 46a, 48a, and upper 46' and lower 48' support arms are connected, at ends 46a', 48a', respectively, to an opposite side. Base 30 includes support arm receiving plate 52 defining opposing openings aligned with openings defined by ends 46a, 46a', respectively, of upper support arms 46, 46' for receiving fasteners pivotably retaining support arms 46, 46' in connection with base 30. Another support arm receiving plate 54 defines opposing openings for alignment with openings defined by ends 48a, 48a' respectively of lower support arms 48, 48'. Upper 46' and lower 48' support arms are pivotably connected at distal ends 46d', 48d', respectively, to tie arm 42' between end 42a' and distal end 42d' of arm 42'. Similarly, upper 46 and lower 48 support arms are pivotably connected at ends 46d, 48d, respectively, to tie arm 42 between end 42a and distal end 42d of arm 42. In the storage configuration of apparatus 10, upper 46, 46' and lower 48, 48' support arms have been rotated toward support member 20 about receiving plates 52, 54, the fastener receiving openings of which are spaced generally lateral the remainder of base 30 to permit rotation to the storage configuration. Lock 112 preferably includes a pair of alignable opening and a pin for insertion through the openings for retaining tongue 14 in fixed relationship to base 30.

Figure 6:
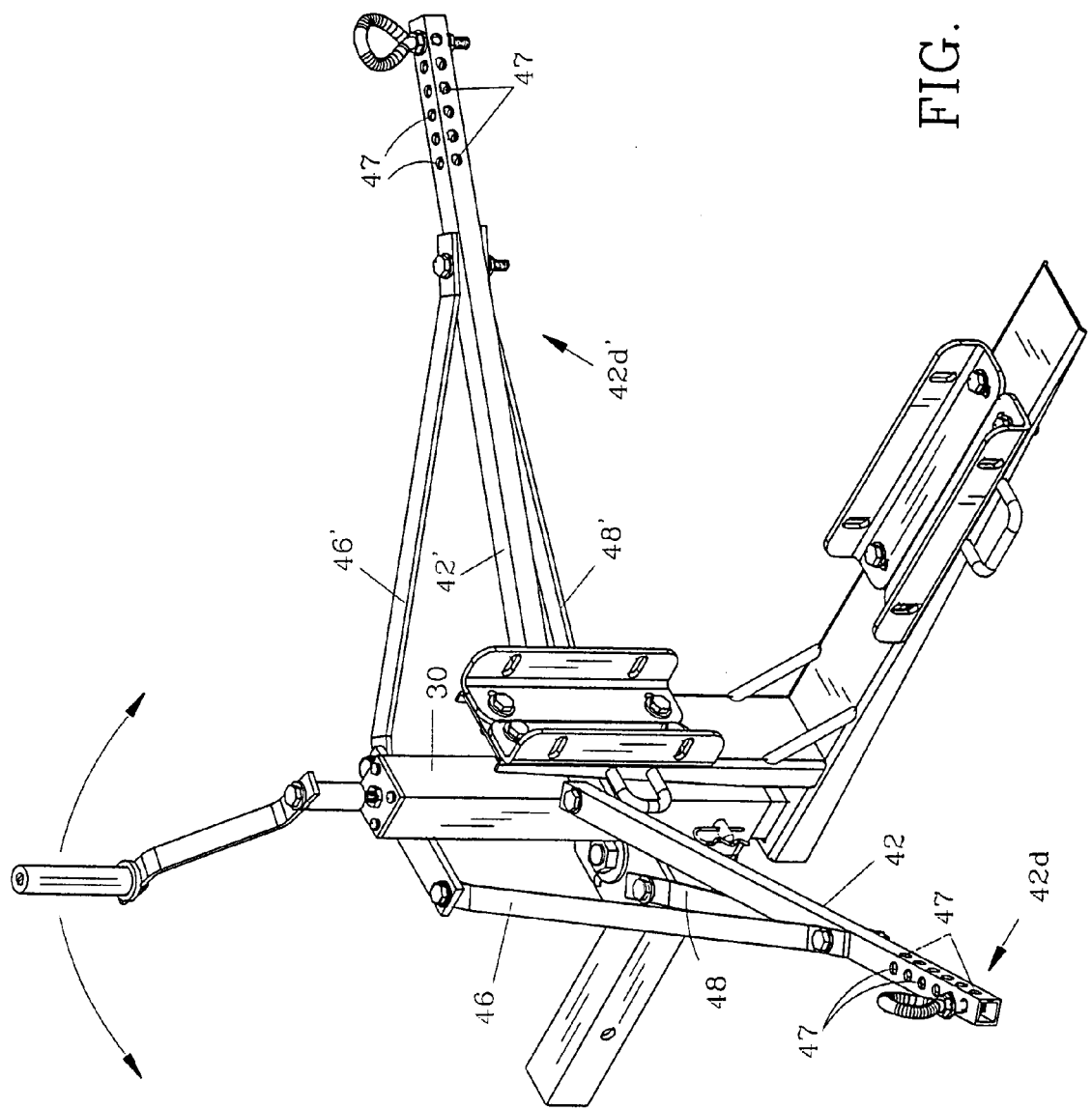
FIG. 6 is a rear perspective view of an apparatus for towing a bike in a configuration for use.
Figure 7:
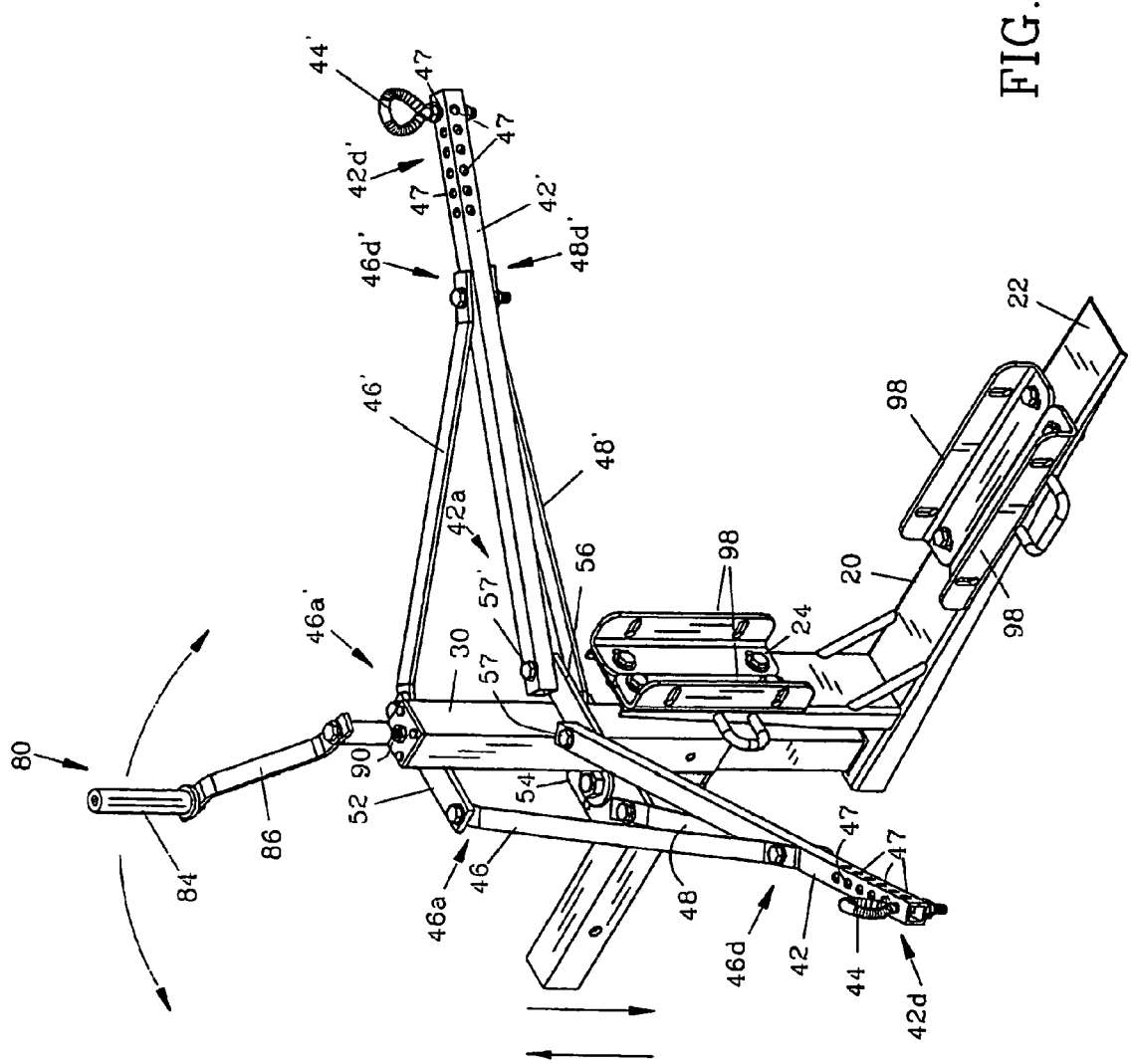
FIG. 7 is a rear perspective view of an apparatus for towing a bike as seen in FIG. 6 but with the support member extended from the base.
Figure 8:
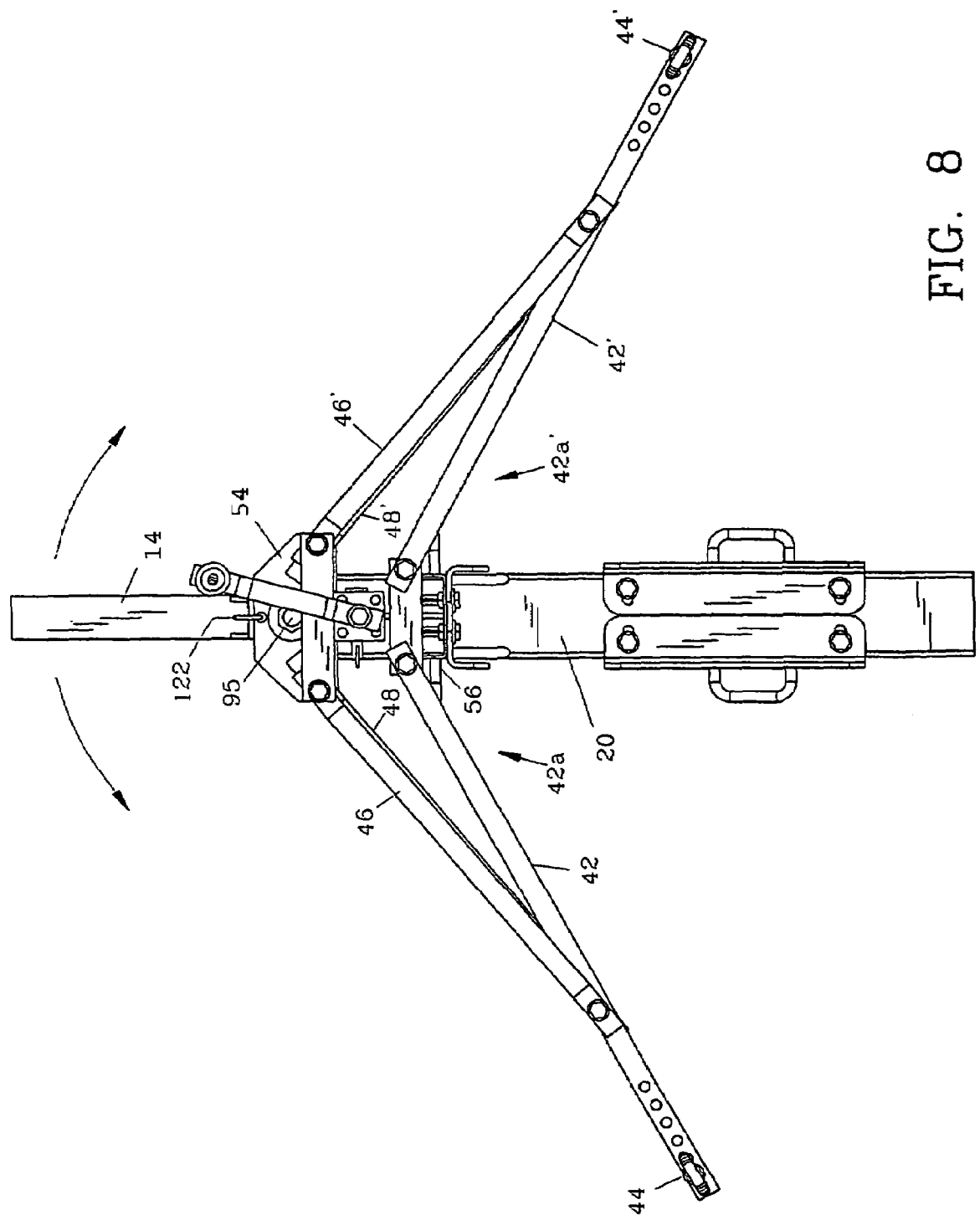
FIG. 8 is a top plan view of an apparatus for towing a bike as seen in FIG. 6.

FIGS. 6-8 show apparatus 10 in the preferred configuration for use. Support arms 46, 48 and 46', 48' have been rotated from support member 20 to align openings at ends 42a, 42a' of opposing tubular tie arms 42, 42', respectively, with openings in tie arm receiving plate 56 of base 30. Distal ends 42d, 42d' of tie arms 42, 42' include strap receiving brackets 44, 44', respectively, that, preferably, each include an eye bolt selectively secured in one of a plurality of openings 47 defined by distal ends 42d, 42d' of tie arms 42, 42', respectively. Fasteners, along with support arms 46, 48 and 46', 48' retain tie arms 42, 42' in substantially stationary disposition with respect to base 30 to stabilize bike B under tow, although arms 42, 42' may bend or flex slightly in response to forces resulting from securing bike B to apparatus 10 and towing bike B.

In an alternative embodiment of the apparatus (not shown), only one support arm is associated with each tie arm, and can optionally be disposed in coplanar alignment in front of or behind, rather than above or below, the tie arm.

FIG. 7, in particular, shows apparatus 10 including base 30 having mechanism 80 with handle 84 connected to lever 86 operatively engaging jack screw 90 for downwardly extending cantilever 22 and forward stop 24 of support member 20 to or nearly to the ground to receive the front of bike B. Mechanism 80 is also operable to retract support member 20 to base 30 after bike B is secured to support member 20. Once secured lock 112 can be repositioned to secure support member 20 to base 30. FIG. 7 also shows a pair of opposing L-shaped side brackets 98 on cantilever 22 and a like pair of opposing L-shaped side brackets 98 on forward stop 24 for positioning bike B on support member 20. Brackets 98 include elongated openings for receiving fasteners fixing brackets 98 to forward stop 24 and cantilever 22. The elongated openings allow brackets 98 to be slidably adjusted depending on the width of the tire. Both forward stop and cantilever 22 include U-shaped handles to assist in securing and stabilizing bike B with straps 66 as needed.

With reference in particular to FIG. 8, tongue 14 is pivotably connected to base 30 by vertical or very nearly vertical rod 95 and lock 122 retains tongue 14 in a fixed position with respect to base 30 for loading and unloading the bike.

With reference to FIGS. 1-8, a preferred method of preparing apparatus 10 for towing bike B behind vehicle V includes, initially, with apparatus 10 in a stored condition, securing pivoting tongue 14 in the vehicle's trailer hitch and pivoting the opposing pairs of support arms 46, 48 and 46', 48' away from support member 20. Lock 112 can be disengaged and mechanism 80 operated to extend support member 20 downwardly with respect to base 30 to or very nearly to the ground to load the front of bike B on cantilever 22 against forward stop 24. Retaining straps 66 secure the front wheel to support member 20.

Once secured mechanism 80 is operable to retract support member 20, lifting the front of bike B while leaving the rear wheel of bike B on the ground. Once support member 20 is fully retracted, lock 112 can be engaged to retain member 20 in a fixed position with respect to base 30. Support arms 46, 48 and 46', 48' may be rotated to align respective ends 42a, 42a' of tie arms 42, 42' with openings defined by plate 56 for fastening with conventional nuts and bolts 57, 57' as seen in FIG. 7. Retaining straps 66 are preferably fastened to the front and rear of bike B and strap receiving brackets 44, 44' to secure and stabilize bike B behind the tow vehicle V as demonstrated in FIG. 1.

The illustrations and examples provided herein are for explanatory purposes and are not intended to limit the scope of the appended claims.

I claim:

1. An apparatus for connection to the rear of a vehicle for towing a bike behind the vehicle, the apparatus comprising:
    a support member, said support member for receiving a front of the bike,
    a base, said base connected to selectively move said support member,
    a tongue, said tongue horizontally, pivotably connected to said base, said tongue for connection to the vehicle,
    a pair of tie arms, a tie arm receiving plate, said tie arm receiving plate joined to said base, said pair of tie arms each pivotally connected to said tie arm receiving plate, said pair of tie arms each defining a plurality of openings, and a pair of strap receiving brackets, each of said pair of strap receiving brackets positioned in one of said plurality of openings on each of said pair of tie arms, and
    a pair of upper support arms, a pair of lower support arms, an upper support arm receiving plate, a lower support arm receiving plate, each of said support arm receiving plates joined to said base, each of said pair of upper support arms pivotably connected to said upper support arm receiving plate at one end and to different ones of said pair of tie arms at the other end, each of said pair of lower support arms pivotably connected to said lower support arm receiving plate at one end and to different ones of said pair of tie arms at the other end.

2. The apparatus according to claim 1 wherein said support member is downwardly extendable from said base for loading the bike, upwardly retractable toward said base for lifting the bike, and fixably securable to said base for towing the bike.

3. The apparatus according to claim 1 further comprising a substantially vertically disposed rod pivotably connecting said tongue with said base.

4. The apparatus according to claim 1 further comprising a mechanism, said mechanism comprising a handle, a lever and a jack screw, said handle connected to said lever, said jack screw engaged by said lever, said jack screw positioned within said base, said mechanism for moving said support member with respect to said base.

5. The apparatus according to claim 1 further comprising a strap, said strap attached to one of said pair of strap receiving brackets and to the bike.

6. The apparatus according to claim 1 wherein each of said pair of strap receiving brackets comprises an eye bolt.

7. The apparatus according to claim 1 further comprising a lock, said lock for retaining said tongue in a fixed position with respect to said base.

8. A method of towing a bike behind a vehicle comprising the steps of:
    a) providing towing apparatus having a support member, a base for selectively moving the support member, a tongue pivotally connected to the base and for connection to the towing vehicle, a pair of pivotal tie arms and a tie arm receiving plate joined to the base with the pair of pivotal tie arms connected to the tie arm receiving plate, each of the pair of tie arms having a plurality of openings for receiving a strap receiving bracket, a pair of strap receiving brackets, each of the pair of strap receiving brackets positioned in different ones of the plurality of openings on the pair of pivotal tie arms, a pair each of upper and lower support arms, an upper support arm receiving plate, a lower support arm receiving plate, each of the support arm receiving plates joined to the base, each of the pair of upper support arms pivotably connected to the upper support arm receiving plate at one end and to a different one of the pair of pivotal tie arms at the other end, each of the pair of lower support arms pivotably connected to the lower support arm receiving plate at one end and to a different one of the pair of pivotal tie arms at the other end,
    b) placing one wheel of a bike to be towed on the support member while the other wheel remains on the ground,
    c) adjusting the tie arms around the bike,
    d) securing the bike to the towing apparatus,
    e) connecting a vehicle to the tongue of the towing apparatus, and
    f) towing the apparatus with the vehicle.

9. The method according to claim 8 wherein securing the bike comprises the step of attaching retaining straps to the bike and to the pair of strap receiving brackets.

* * * * *